United States Patent Office 3,364,105
Patented Jan. 16, 1968

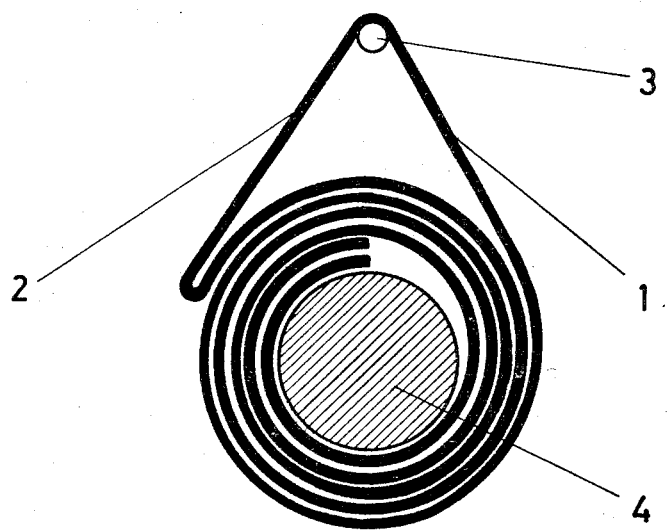

3,364,105
VAPOUR EMISSIVE COMPOSITIONS CONTAINING DIMETHYL DICHLOROVINYL PHOSPHATE
Max Geiger, Riehen, and Richard Fuerer, Basel, Switzerland, assignors to Ciba Limited, Basel, Switzerland, a Swiss company
Filed Feb. 7, 1964, Ser. No. 343,359
Claims priority, application Switzerland, Feb. 11, 1963, 1,673/63
2 Claims. (Cl. 167—22)

The present invention provides a preparation in solid form for the prolonged discharge at a uniform rate of organic volatile, liquid active substances, more especially biocides, containing in addition to the active substance:

(a) An organic, solid, preferably crystalline substance, melting within the range from 40 to 200° C., preferably from 40 to 180° C., which sublimes at ambient temperature and is inert to the active substance, and (b) A finely porous absorbent carrier that is inert towards the active substance.

The present invention is especially concerned with a preparation for the prolonged discharge, preferably at a substantially uniform rate, of volatile biocidal organic phosphorus compounds, especially dimethyl dichlorovinyl phosphate (DDVP) and its derivatives, containing in addition to the active substance:

(a) An unsubstituted or substituted aromatic hydrocarbon, preferably naphthalene, or a chlorobenzene, especially para-dichlorobenzene, or camphene or a derivative thereof, especially camphor, or urethane, acetylurethane, menthol or trioxane, and (b) Finely porous silica or silicate, dried silica gel, absorbent or active carbon, wood meal, cellulose, mechanical wood pulp, or a natural, synthetic or semisynthetic fibrous material, especially in the form of a fabric or fleece.

Particularly good results are obtained with those preparations of the invention which contain as active substance a liquid, volatile biocidal organic phosphorus compound, preferably dimethyl dichlorovinyl phosphate or a derivative thereof, especially a homologue thereof, in a concentration of from 20% to 100%, preferably 20 to 50%, of the weight of the sublimable substance defined above under (a).

Many volatile liquid active substances, above all biocidal organic phosphoric acid esters, occasion great practical difficulty in handling and in formulating into preparations of sufficient stability which are easy to manipulate, do not give rise to quantities of obnoxious vapours that are hazardous to personnel, and which allow adequate control and sufficient uniformity of emission over a long period of time. Properly formulated, the new preparations of the invention satisfy these demands to an unexpected degree. Compared with the known preparations which consist of only two essential components, namely the active substance (for example DDVP) and a volatile component, they offer above all the advantage that a much larger quantity of the volatile liquid active substance can be used for a given quantity of volatile component (often so that the active substance makes up a considerable share of the weight of the preparation as a whole), without the occurrence of undesirable exudations of the liquid active substance from the preparation. Whereas increases in the ambient temperature often have disastrous effects in the case of binary systems, for example a system consisting of naphthalene and DDVP, and favour the exudation of the liquid active substance, in the case of preparations according to the present invention such exudation occurs only when the ambient temperature approaches the melting point of the volatile component. It has further been found that in the preparations of the present invention the active substance, for example DDVP, is substantially protected in the bulk against the adverse influences of hydrolytic and/or oxidative agencies.

It would have been expected that, after having discharged the active substance for a short time, the absorbent, non-volatile vehicle would substantially inhibit any further discharge, but this is surprisingly not the case in actual practice.

By suitable selecting and shaping the vehicle a substantially uniform evaporation can be achieved. When the discharge must satisfy specially high demands insofar as constancy and duration are concerned, the vehicle must be selected and shaped so that the layer which has its associated active substance by evaporation detaches itself automatically and continuously and thereby exposes for evaporation new layers of active substance.

This effect of the continuous renewal of the evaporation surface can be achieved in different ways. Thus, for example, the absorbent material may be in a finely granular form so that it trickles off as soon as the active substance and the sublimable assistant which have served as binder for the absorbent particles have evaporated. Alternatively, an impregnated or coated strip of absorbent fibrous material may be used which is in the form of a reel with the volatile components serving as adhesive between the layers, the fibrous carrier being caused to unroll as the exposed volatile components serving as adhesive are evaporated. The unrolling may be continuous or intermittent as desired and may be caused solely under the influence of the weight of the spent unravelled part of the fibrous strip.

The preparations of the invention may be used in any circumstances where the biocidal active substance of the kind defined above which it contains will be effective in pest control, in plant protection and in hygiene.

The active substance DDVP and homologues thereof act against insects and acarides in their various stages of development, such as ova, larvae and imagines.

The term "volatile, liquid biocidal organic phosphorus compounds" includes all those compounds of the class mentioned which, in the form of individual substances, have a vapour pressure such that they give off small but effective amounts of the active substance into the surrounding atmosphere, for example compounds having a vapour pressure at 25° C. of from 0.001 to 0.1 mm. Hg, and which are liquid at a temperature of 70° C.

As examples of particularly suitable representatives of the said compounds there may be mentioned compounds of the formula

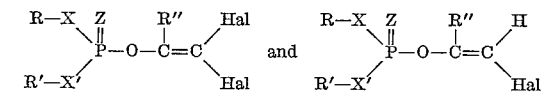

where R and R' each represents an alkyl radical, which may be substituted by a chlorine atom, containing 1 to 5 carbon atoms; R" represents hydrogen or methyl; X, X' and Z each represents an oxygen or a sulphur atom, and Hal are halogen atoms, preferably chlorine or bromine atoms—especially dimethyl dichlorovinyl phosphate (DDVP), diethyl dichlorovinyl phosphate, diallyl dichlorovinyl phosphate, di-n-propyl dichlorovinyl phosphate, di-n-butyl dichlorovinyl phosphate, di-isobutyl dichlorovinyl phosphate, di-secondary butyl dichlorovinyl phosphate, bis-(β-chloroethyl)-dichlorovinyl phosphate, compounds of the formula

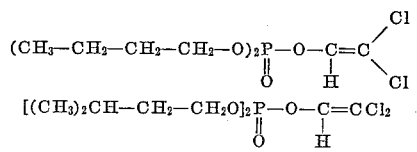

and

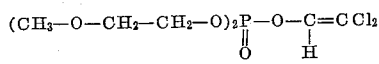

and dimethyl- and diethyl-dibromovinyl phosphate, methylethyl dichlorovinyl phosphate, and esters derived from the above general and particular formulae by saturating the carbon-carbon double bond with halogen atoms, for example the bromination product of DDVP, dimethyl-1:2-dibromo-2:2-dichloro-ethyl phosphate.

A further ingredient of the new preparations may be an oxidation inhibitor, for example one of the usual aliphatic or aromatic oxidation inhibitors, such as 1:2-propyleneglycol, 2:6-di-tertiary butylphenol, butylhydroxyanisole, bis - (3:5 - di - tertiary butyl - 4 - hydroxyphenyl)-methane, 3:5-di-teriary butyl-4-hydroxybenzyl alcohol or 3:5-diisopropyl-4-hydroxybenzyl alcohol; likewise suitable as oxidation inhibitors are hydroquinone, resorcinol and pyrogallol.

The following examples illustrate the invention, the parts being by weight.

EXAMPLE 1

(a)

A mixture of:
60 parts of naphthalene
30 parts of DDVP, and
10 parts of finely dispersed silica "Hisil" trademark was heated until the naphthalene had melted.

The melt was cooled while being stirred until a still liquid crystalline magma had formed which was then transferred to a cylindrical vessel made from plastic material and allowed to solidify in it. During storage this filled vessel was closed with a metal foil which was removed before the preparation was applied.

In a similar manner preparations of the following compositions were manufactured:

(b)
40 parts of naphthalene
40 parts of DDVP
20 parts of "Hisil" (trademark)

(c)
60 parts of naphthalene
30 parts of DDVP
10 parts of dried, finely granular silica gel ("Silica gel" trademark)

(d)
80 parts of trioxane
20 parts of DDVP
10 parts of kieselguhr (e)
55 parts of naphthalene were finely ground and mixed with
5 parts of hexane,
30 parts of DDVP, and
10 parts of granular silica gel and from this mass test bodies were pressed and so placed in suitable shaped dishes that the vehicle could trickle off automatically.

For use the moulding was advantageously so arranged that the evaporation surface faced either sidewards or downwards; in this manner the trickling off of the vehicle was ensured without forming an undesirable accumulation on the evaporation surface.

It is of advantage to further add to the above preparations a scent to mask the odour of the vehicle. There may be added for this purpose, for example, 1 g. of synthetic rose oil.

EXAMPLE 2

(a) The following liquids were poured over pressed plates of mechanical wood pulp, each weighing 15 g., and allowed to solidify:

(1)
14 g. of trioxane
4 g. of DDVP (2)
14 g. of urethane
4 g. of DDVP (3)
14 g. of acetylurethane
6 g. of DDVP (b)

A molten mixture of:
10.5 g. of acetylurethane
7 g. of DDVP, and
3.5 g. of menthol was poured over a cardboard felt, weighing 15 g., and allowed to solidify.

(c)

A molten mixture of:
14 g. of trioxane, and
4 g. of DDVP was poured over a pressed plate from sugarbeet fibres, weighing 10 g., and allowed to solidify.

EXAMPLE 3

(a) A loosely woven cotton band was wrapped round a cardboard cylinder and impregnated with a molten mixture of 2 parts of naphthalene and 1 part of dimethyl dichlorovinyl phosphate.

For use the roll was suspended by the open end of the band after the melt applied to it had dried. The cooled melt bonds the superimposed layers of the band on the roll together so tightly that the layers of the band forming a roll unrolled only when the melt had gradually evaporated. Thus, the gradually altering surface of the roll causes the active substance to be discharged slowly and uniformly.

(b) A doubled-over length of coloured wool felt (weighing 30 g.) was wound, with one component strip on top of the other and by starting at the loose ends of the strips, on a cardboard cylinder and then uniformly impregnated with 55 g. of a melt of 2 parts of naphthalene and 1 part of DDVP. The resultant device was then suspended beneath a suitable support by first opening-up the doubled-over free end of the wool length and then hooking it over the support, the two strips having been peeled away from the bulk roll so that they were adhesively united with the underlying layers at approximately diametrically opposite points, and the device adjusted on the support so that the two said points were approximately at the same level. As evaporation of the active substance and the volatile solid component occurred, the strips gradually detached themselves from the bulk roll. Such a mounted device is indicated diagrammatically and in end view in the accompanying drawing in which the felt strips are numbered 1 and 2, respectively, the support is numbered 3 and the spool is numbered 4.

The preparations described in Examples 1 to 3 displayed a distinctive insecticidal action, for example, against *Musca domestica*, also against *Aphis fabae*, and an acaricidal action, for example, against *Tetranychus urticae*. An examination after 4 weeks use of the preparation described in Example 1 under (a) revealed that it had lost substantially none of its activity.

What is claimed is:

1. An insecticidal preparation of prolonged effectiveness consisting essentially of (a) an insecticidal amount of dimethyl dichlorovinyl phosphate, (b) a member selected from the group consisting of naphthalene, para-dichlorobenzene, camphene, camphor, urethane, acetylurethane, menthol and trioxane, and (c) as a carrier, finely porous SiO$_2$, component (a) being present in an amount of 20% to 100% by weight of component (b), said component (c) is in an amount of at least 10% of the total weight.

2. A preparation as claimed in claim 1, wherein naphthalene is used as component (b).

References Cited

UNITED STATES PATENTS 3,093,536  6/1963  Loeffler _____ 167—48 X
3,097,128  7/1963  Sprinkle _____ 167—42 X

OTHER REFERENCES

King, U.S. Department of Agriculture, Agriculture Handbook No. 69, May 1954, pp. 1 to 21, 66 (item No. 1634–1636, 1642–1644), 101 (item Nos. 2800 and 2803), 105 (item No. 2955), 226 (item No. 6989), 232 (item No. 7184), and 251 (item No. 7844).

Chemical Abstracts, 36:6749 (4) (1942).

ALBERT T. MEYERS, *Primary Examiner.*

JULIAN S. LEVITT, *Examiner.*

J. D. GOLDBERG, *Assistant Examiner.*